(12) United States Patent
Lundbäck

(10) Patent No.: US 10,640,942 B2
(45) Date of Patent: May 5, 2020

(54) SKIMMING AND SEPARATION DEVICE

(71) Applicant: Surfcleaner AB, Vaxholm (SE)

(72) Inventor: Stig Lundbäck, Vaxholm (SE)

(73) Assignee: Surfcleaner AB, Vaxholm (SE)

( * ) Notice: Subject to any disclaimer, the term of this patent is extended or adjusted under 35 U.S.C. 154(b) by 45 days.

(21) Appl. No.: 15/780,723

(22) PCT Filed: Nov. 17, 2016

(86) PCT No.: PCT/SE2016/051138
§ 371 (c)(1),
(2) Date: Jun. 1, 2018

(87) PCT Pub. No.: WO2017/095302
PCT Pub. Date: Jun. 8, 2017

(65) Prior Publication Data
US 2018/0355571 A1    Dec. 13, 2018

(30) Foreign Application Priority Data
Dec. 3, 2015 (SE) ..................................... 1551584

(51) Int. Cl.
*E02B 15/10* (2006.01)
*E02B 15/04* (2006.01)
*B01D 21/24* (2006.01)

(52) U.S. Cl.
CPC ........ *E02B 15/106* (2013.01); *B01D 21/2433* (2013.01); *E02B 15/045* (2013.01)

(58) Field of Classification Search
CPC ....... E02B 15/045; E02B 15/10; E02B 15/106
(Continued)

(56) References Cited

U.S. PATENT DOCUMENTS 3,722,688 A * 3/1973 Wirsching ............ E02B 15/107
210/242.3
3,722,689 A * 3/1973 Markel ................. E02B 15/107
210/242.3
(Continued)

FOREIGN PATENT DOCUMENTS

WO    97/07292    2/1997
WO    99/22078    5/1999
(Continued)

OTHER PUBLICATIONS

International Search Report and Written Opinion for corresponding Patent Application No. PCT/SE2016/051138 dated Feb. 3, 2017.

*Primary Examiner* — Christopher Upton
(74) *Attorney, Agent, or Firm* — Renner, Otto, Boisselle & Sklar, LLP

(57) ABSTRACT

A skimming and separation device comprising an outer casing (1) provided with constructions to directly or indirectly fasten all parts, defining an open container (2), and a floater (3) configured to create the skimming function of the device, the floater is attached at its lower side to an essentially vertically arranged bellow (4) allowing the floater to adapt flow into a substantially circum volume and allowing the floater to move from an upper position with essentially no flow into the container (2) to a lower position allowing flow of water and debris follow the contours of the floater (3) in a downward direction into the device. A power device (8) is provided and includes a propeller to achieve in-flow and outflow of the device. The device further comprises a bypass member (B) being in fluid communication to an under pressure source via a suction tube (12), such that, during operation, an essentially continuously under pressure suction force is available at the bypass member. The bypass member and a guiding unit arranged in the device are both structured to continuously subject debris and floating pol- (Continued)

Figure 1A:
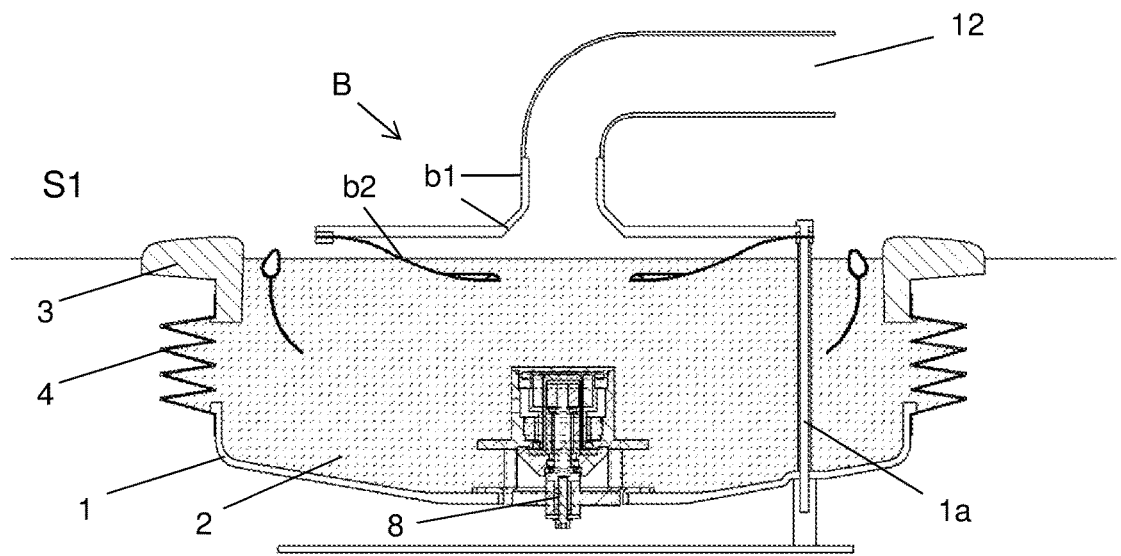

lutions to be accumulated on an upper surface in the skimming and separation device and to be subject to the suction force such that the debris and floating pollutions will enter the suction tube (12) directly and to facilitate a continuous flow pollutants to a tank.

10 Claims, 8 Drawing Sheets

(58) Field of Classification Search
USPC .................. 210/122, 242.1, 242.3, 776, 923
See application file for complete search history.

(56) References Cited

U.S. PATENT DOCUMENTS

| | | | | |
|---|---|---|---|---|
| 3,741,391 A | * | 6/1973 | Donsbach | E02B 15/106 210/242.3 |
| 3,831,756 A | * | 8/1974 | Bhuta | E02B 15/106 210/242.3 |
| 3,853,767 A | * | 12/1974 | Mohn | E02B 15/106 210/242.3 |
| 4,038,182 A | * | 7/1977 | Jenkins | E02B 15/107 210/242.3 |
| 4,142,972 A | * | 3/1979 | Nebeker | E02B 15/107 210/242.3 |
| 6,274,046 B1 | * | 8/2001 | Lundback | E02B 15/106 210/242.3 |
| 6,743,358 B1 | | 6/2004 | Lundbäck | |
| 7,807,059 B2 | | 10/2010 | Lundback et al. | |

FOREIGN PATENT DOCUMENTS

| | | | |
|---|---|---|---|
| WO | WO 2014/168577 | * | 10/2014 |
| WO | WO 2104/168577 | * | 10/2014 |

* cited by examiner

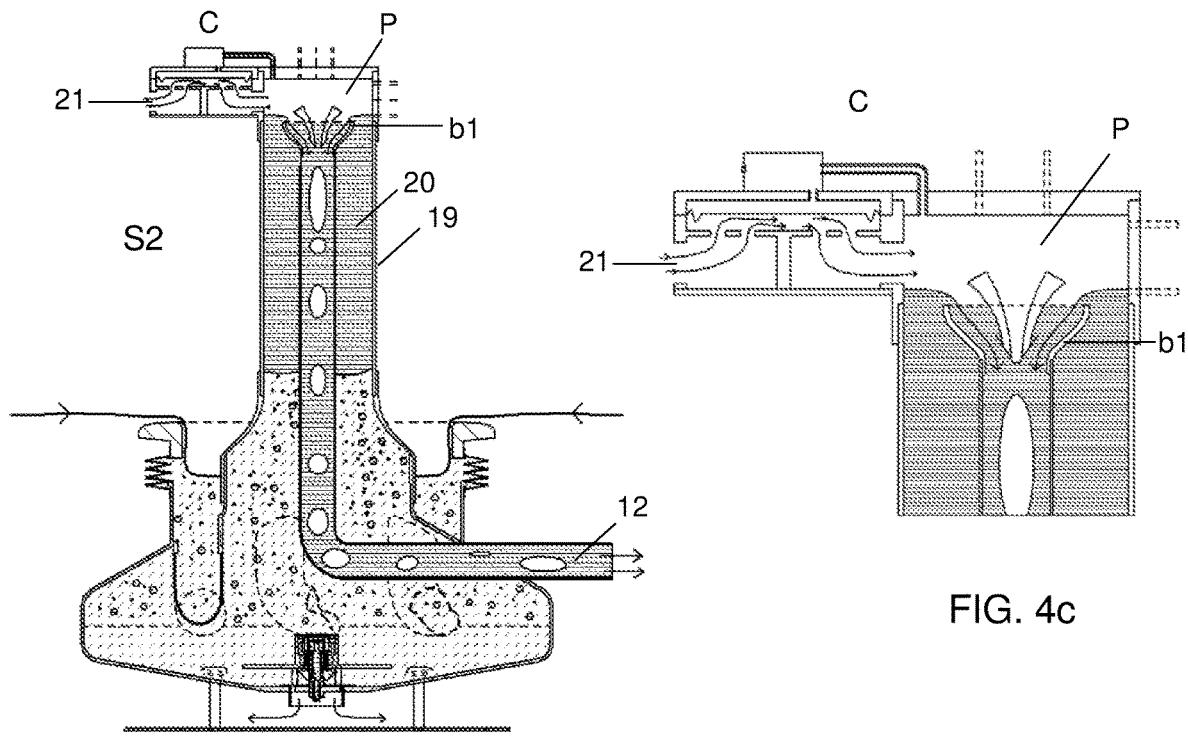
FIG. 4a
FIG. 4c
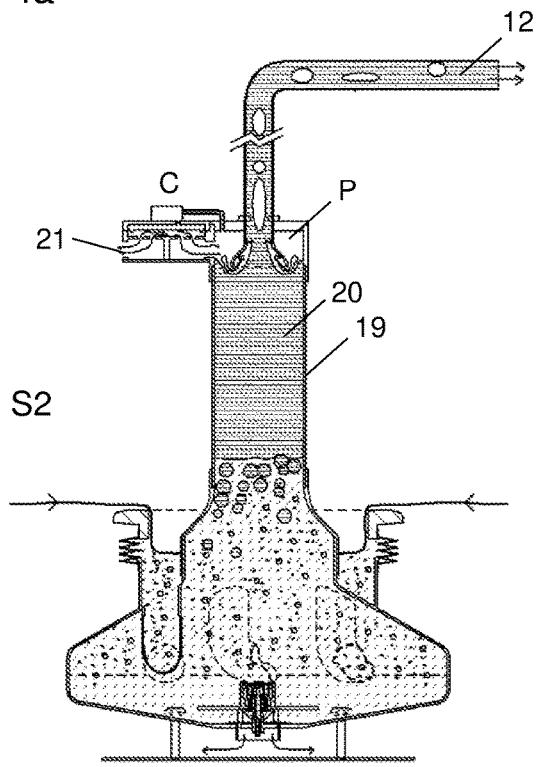
FIG. 4b

SKIMMING AND SEPARATION DEVICE

This application is a national phase of International Application No. PCT/SE2016/051138 filed Nov. 17, 2016 and published in the English language, which claims priority to Swedish Patent Application No. SE 1551584-4 filed Dec. 3, 2015, which are hereby incorporated herein by reference.

FIELD OF THE INVENTION

The present disclosure relates to a skimming and separation device according to the preambles of the independent claims.

BACKGROUND OF THE INVENTION

Herein is disclosed a skimming and separation device for collecting material floating on the surface, that may be applied for collecting different kinds of pollutants, both solid and liquid, floating the water, but it is particularly devised and suited for collecting oil spilled on a water surface, including oil mixed with solid material.

In WO97/07292 and WO99/22078 various examples of prior art system are disclosed. Furthermore, U.S. Pat. Nos. 6,743,358, 7,807,059 and WO-2014/168577 disclose systems and devices related to the skimming and separation device to be disclosed in the present application.

These known systems and apparatuses comprise a collection vessel provided with a side wall comprising an upper wall part, a floater, which has some buoyancy. The floater is attached at its lower side to an essentially vertically arranged bellow allowing the floater to move from an upper position where no flow may enter the apparatus to a lower position forming a skimming weir allowing flow of water and debris to follow the contours of the floater and hit an open circular water compartment, the skimming compartment, with a water level that is determined by the speed of a propeller, the floating forces of the floater and the force gradients generated by differences in areas between the bellow floater.

In one known device disclosed in U.S. Pat. No. 6,743,358 the circular water compartment is at its upper end in open contact with atmospheric pressure and at its lower end delimited by a wall that holds the inlets of the collection vessels.

In WO-2014/168577 is disclosed a skimming and separation device provided with angulated nozzles, arranged to achieve a flow from the skimming compartment to the closed separating and collecting compartment. The angulated nozzles make the fluid including the pollutants to obtain a rotating motion within the separation and discharge compartment. The rotation of the fluid in the separation and discharge compartment makes a large horizontal area with a homogenous vertical speed. The discharge of fluid in the bottom of the separation compartment will generate a vertically oriented speed. This speed may be adjusted to be lower than the speed that the gravitational separation forces are generated to bring the pollutants towards the discharge area/compartment.

The separation compartment is delimited upward by a top wall with a discharge opening through which the oil and other pollutants may be expelled, by an equal exchange of water and/or pollutants entering into the separating and collecting compartment.

Water can be discharged or fed into the closed separating and collecting compartment through the collection vessel and through an opening in the bottom wall of the collection vessel, where a motor and propeller are arranged.

The collected debris is discharged from the collection compartment by reversing the propeller and feeding water into the separating and collection compartment. This leads to a backflow through the collecting vessels causing the skimming weir to be pressed against an overlying plate leading to a closure and pressure increase in the skimming and collecting compartment. This will further result in a pressure increase in the separating and collection compartment resulting in that collected oil in the collecting compartment will be pressurized and be expelled through the discharge opening into a suitable recipient.

The generated rotation of water and pollutants described in WO-2014/168577 is advantageous in many aspects. However, in some situations solid objects of various kinds are carried along by the oil and e.g. foam and may start clogging, this in turn may cause problems when being discharged from the separation and discharge compartment.

Furthermore, in some occasions the intermittent discharging phases often applied in the system of WO-2014/168577 may cause problems in transportation of pollutants from the separator to a suitable collecting tank. In addition, intermittent discharging phases are time consuming and may lower the overall capacity of the skimming and separation device.

It has further been shown that floating solid debris such as e.g. bottle caps, pieces of plastic, pieces of bark and wood, leaves or other plant debris that will not form a drop form takes considerably longer time to float upwards to the top of the separating unit for eventual discharge into a storage tank.

Thus, the object of the present invention is to achieve an improved skimming and separation device that eliminates, or at least mitigates, the above stated drawbacks. The improved device is less time-consuming to use, has a higher capacity, and has the capability of an improved handling of floating solid debris.

SUMMARY OF THE INVENTION

At least the above-mentioned objects are achieved by the present invention according to the independent claim. Preferred embodiments are set forth by the dependent claims.

According to a first aspect of the present invention it relates to a skimming and separation device comprising a bypass member, being open to atmospheric pressure or a bypass member with an automatically controlled constant under pressure that provides for a continuous removing of the collected floating pollutants from a separating unit and facilitate transportation of the pollutants to a suitable storage tank without disturbing the separating functions of the skimming and separation device.

According to a second aspect of the present invention the skimming and separation device is provided with a guiding unit capable of achieving a bypass function for solid debris such as e.g. bottle caps, pieces of plastic, pieces of bark and wood, leaves or other plant debris such that the solid debris will enter directly onto the discharge zone of the compartment for collected debris for further transportations by suction forces to a suitable storage unit.

SHORT DESCRIPTION OF THE APPENDED DRAWINGS

Figure 1B:
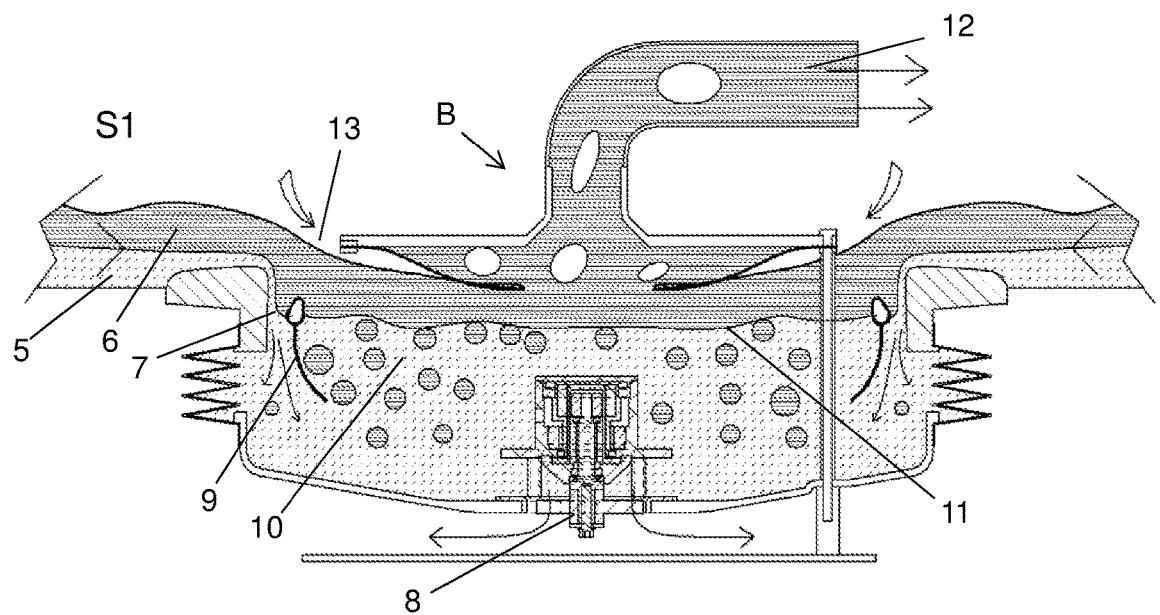

FIGS. 1a and 1b disclose cross-sectional views of a first embodiment of a separator (S1) according to the invention where a bypass member (B) is provided, which is open to atmospheric pressure and thereby allows a flow of gas, to facilitate a continuous flow of debris and or oil to a suitable vacuum tank (not shown).

Figure 2A:
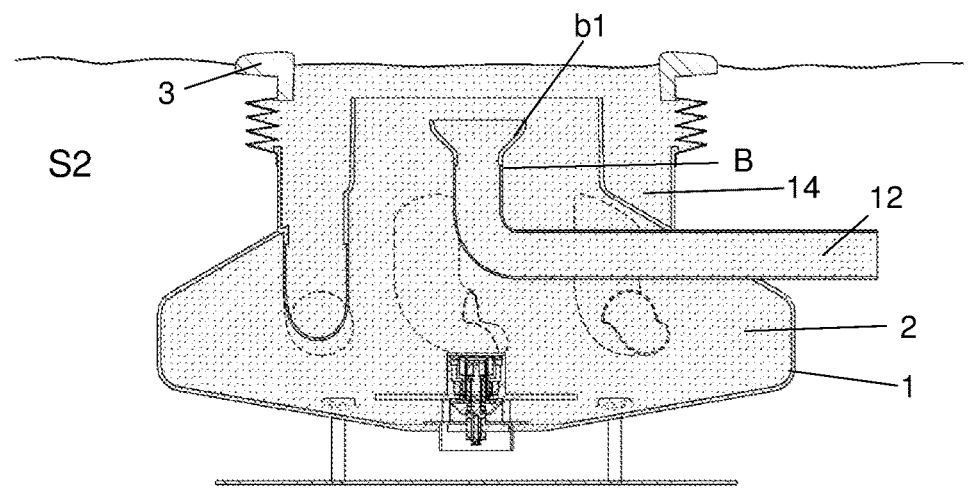
Figure 2B:
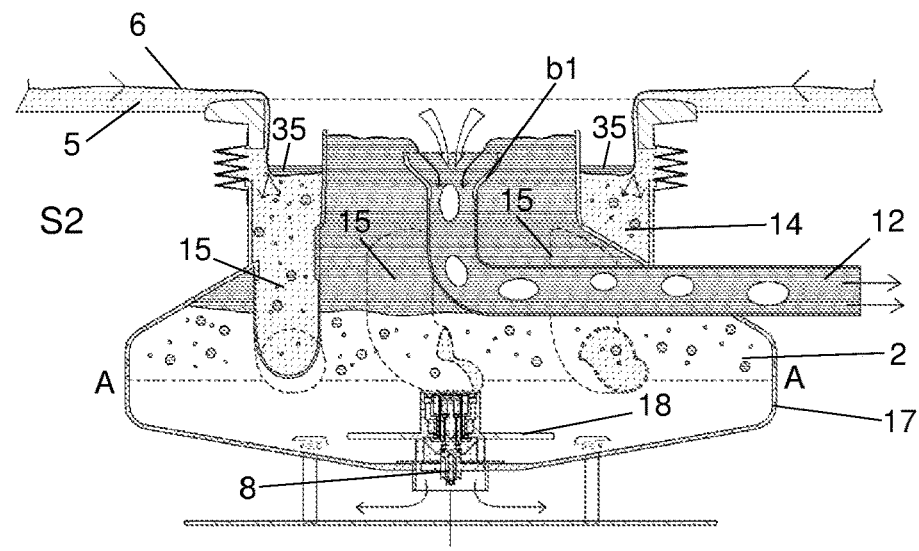
Figure 2C:
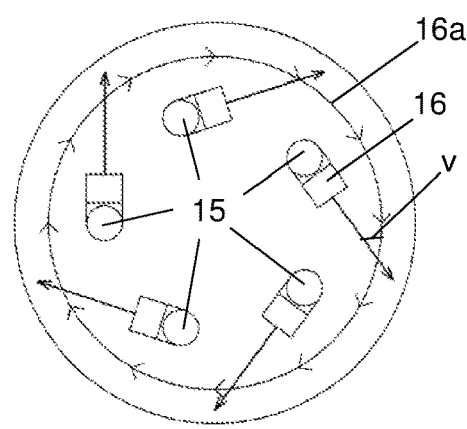

FIGS. 2a-2b disclose cross-sectional side views of a second embodiment of a separator (S2) with a higher separating factor where a bypass member (B) is provided, which is open to atmospheric pressure and thereby allows a flow of gas, to facilitate a continuous flow of debris and or oil to a suitable vacuum tank (not shown). FIG. 2c discloses a cross-sectional view along line A-A in FIG. 2b.

Figure 3A:
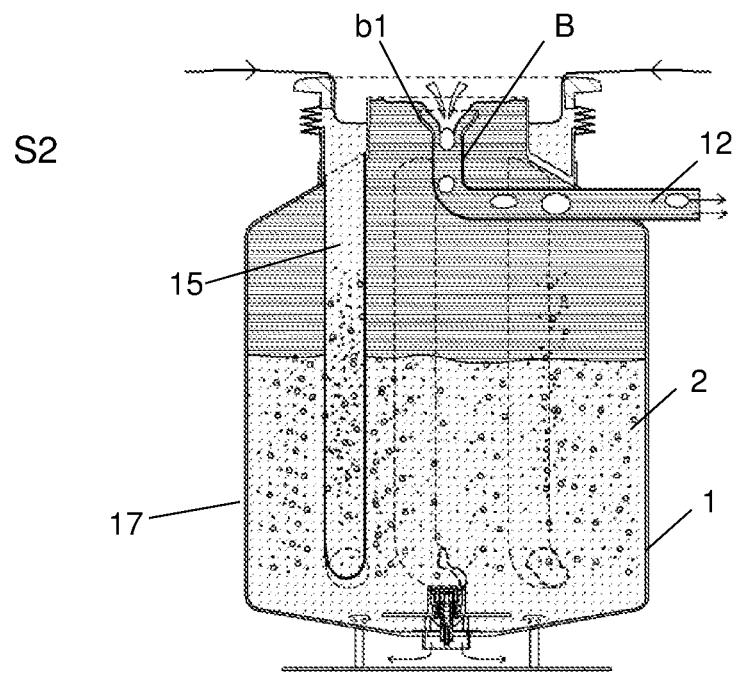
Figure 3B:
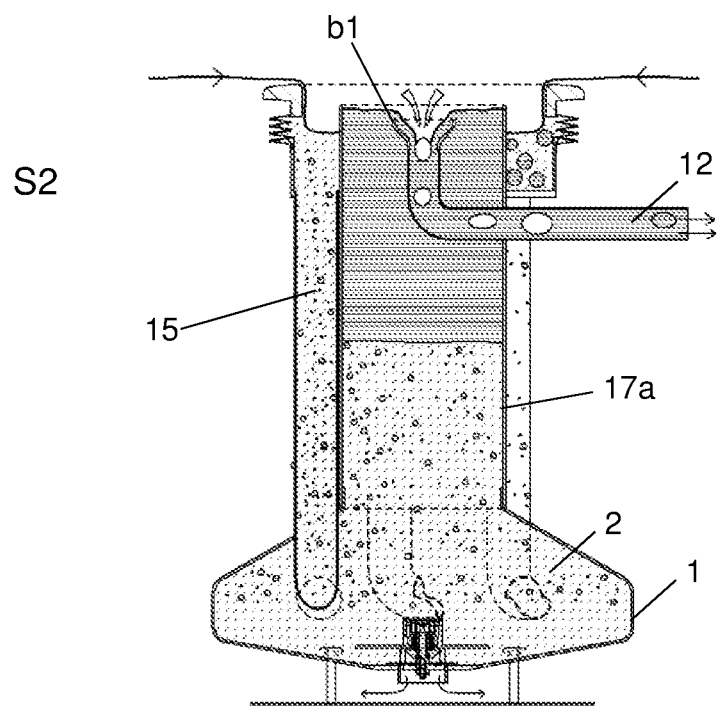

FIGS. 3a and 3b disclose cross-sectional views of modified forms of the second embodiment of a separator (S2) to enhance floating forces to avoid water entering into the open bypass member.

FIGS. 4a-4c disclose cross-sectional views of the second embodiment of a separator (s2) where an automatically controlled bypass member (C) both keeps a constant under pressure to enhance the floating forces and also allows a flow of gas, to facilitate a continuous flow of debris and/or oil to a suitable vacuum tank (not shown).

Figure 5A:
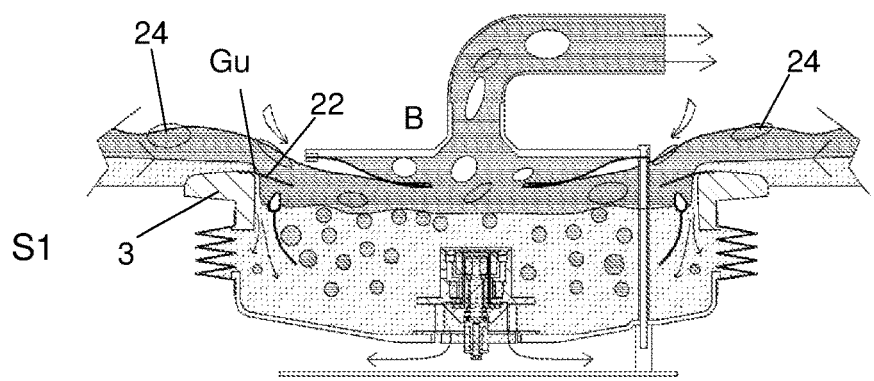
Figure 5B:
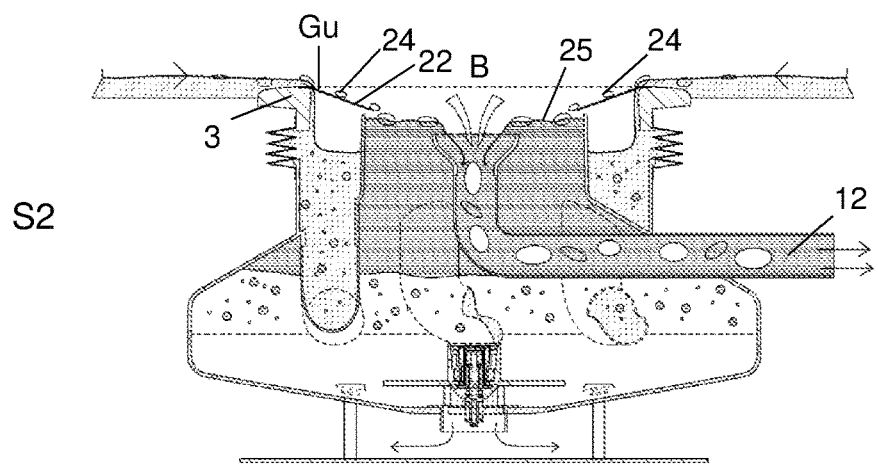
Figure 5C:
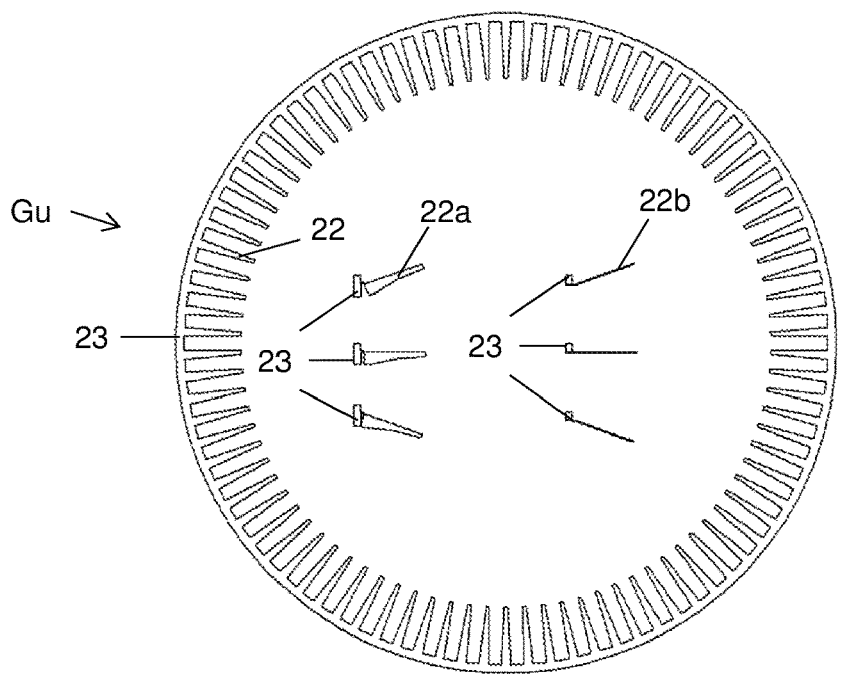

FIGS. 5a-5b disclose cross-sectional views of a separator (S1) and (S2) where a guiding unit (Gu), comprising finger-like guiding elements (22), is provided to make a bypass for solid debris such that the solid debris will enter directly into the top of the compartment for collected debris for further transportation by under-pressure/vacuum to a suitable vacuum tank. FIG. 5c is a top view of the guiding element Gu.

Figure 6A:
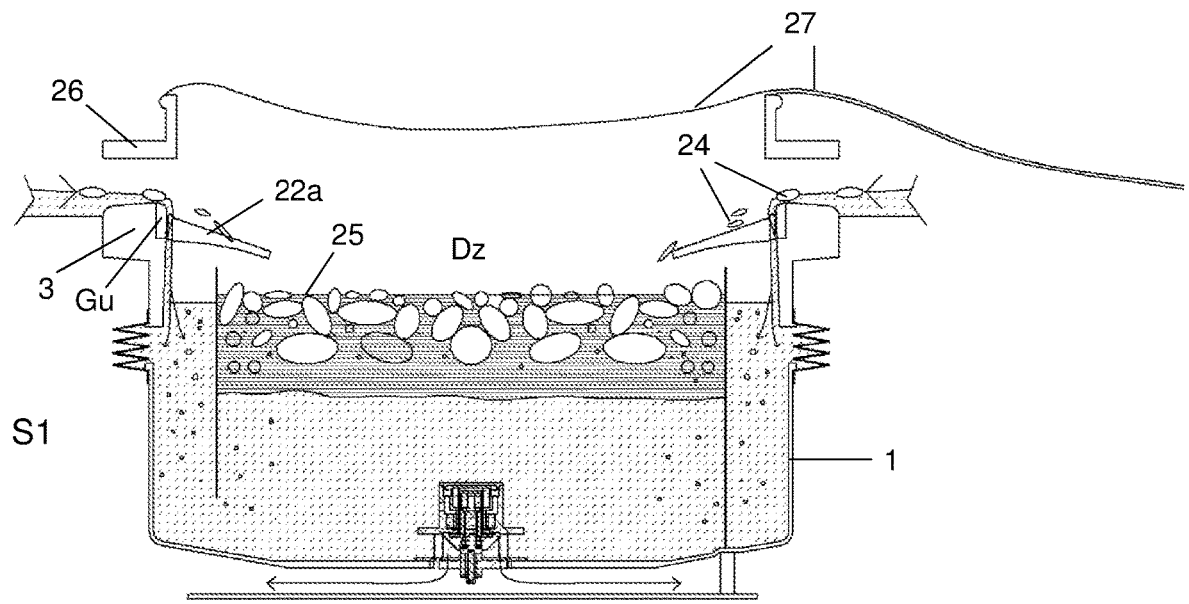
Figure 6B:
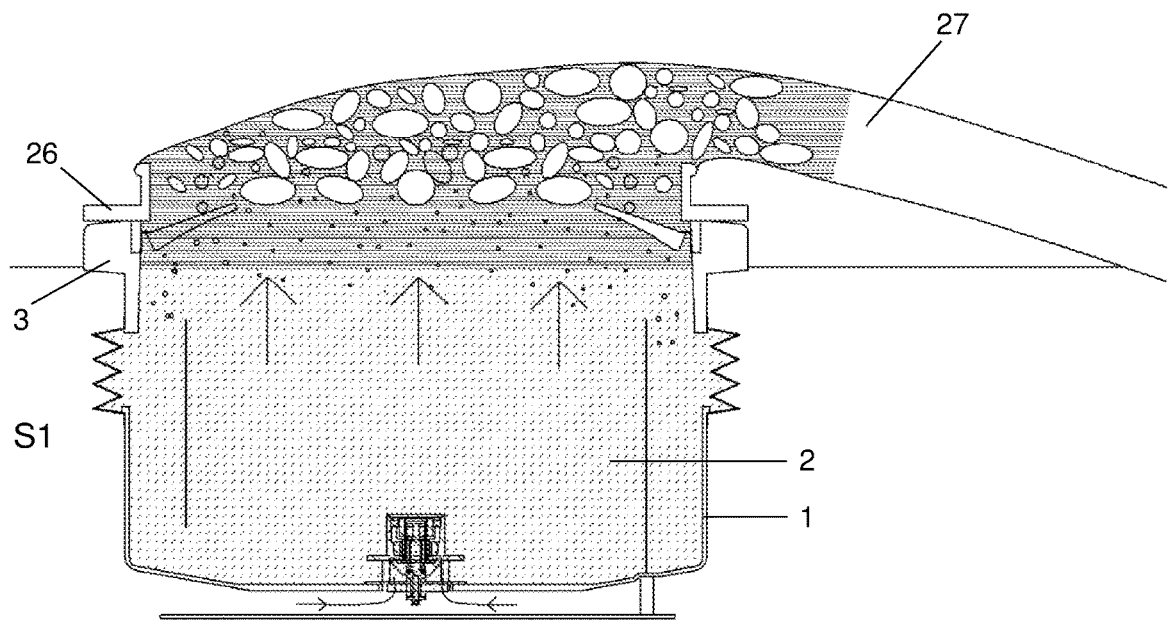

FIGS. 6a-6b disclose cross-sectional views of the first embodiment of a separator (S1) where finger-like guiding elements (22a) of a guiding unit make a bypass for solid debris to enter directly on top of the compartment for collected debris and where a top lid (26) and a reversed rotation of the propeller (8) create a pressure resulting in that the collected debris is emptied into e.g. a suitable floating filtering sack.

Figure 7A:
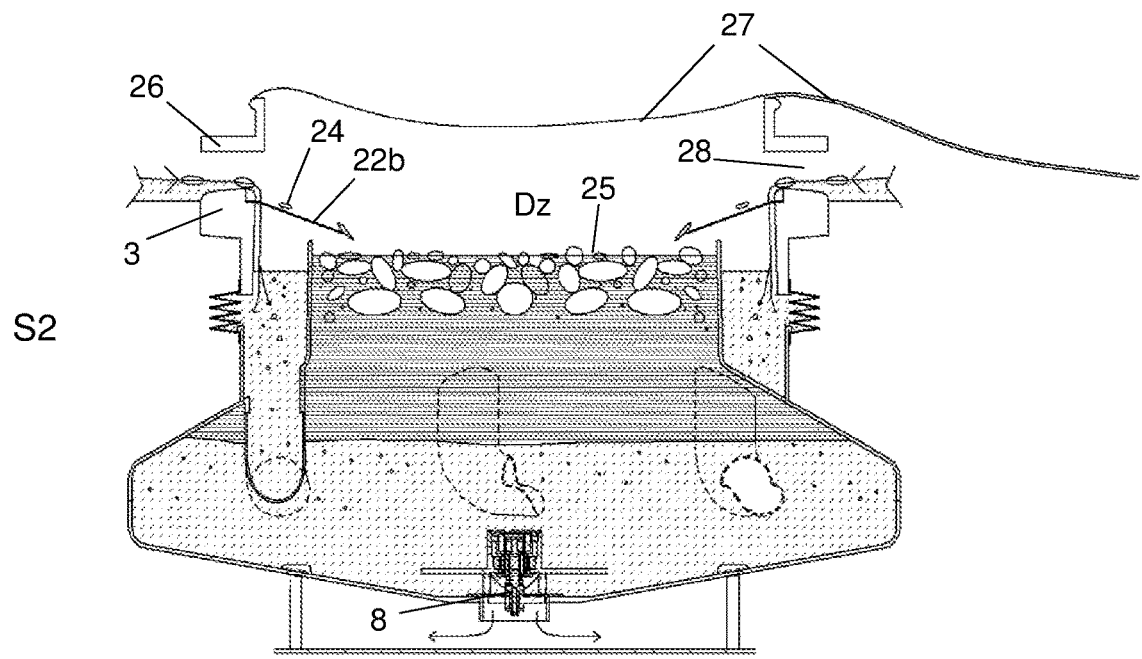
Figure 7B:
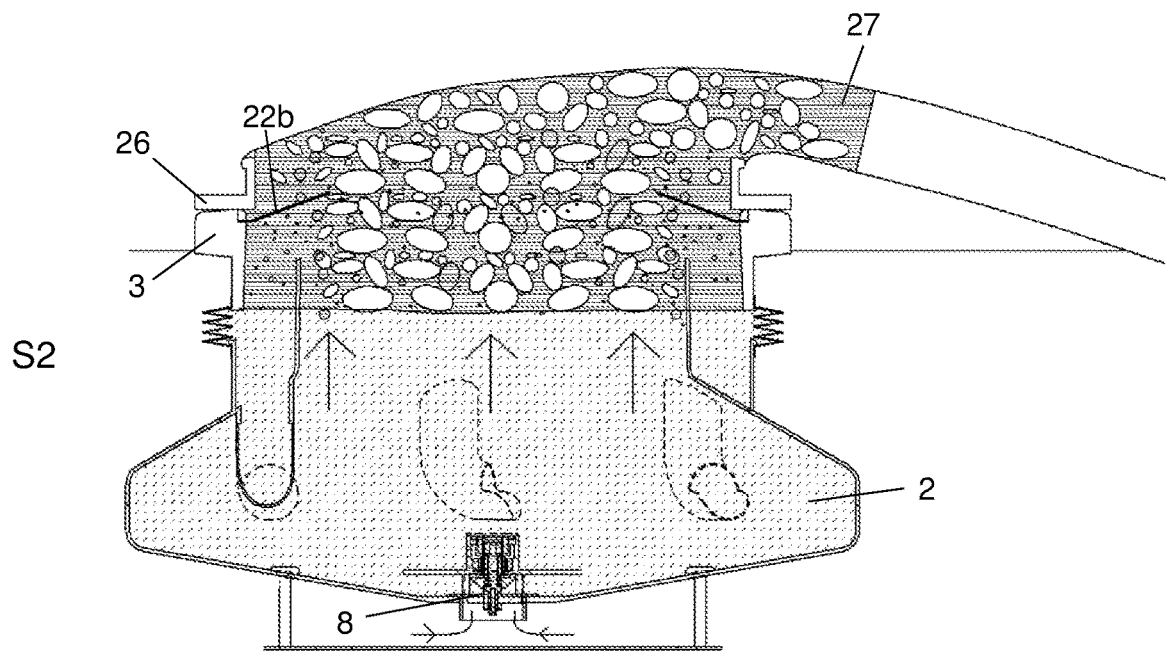

FIGS. 7a-7b disclose cross-sectional views of the second embodiment of a separator (S2) with a high separating factor where finger-like guiding elements (22b) of a guiding unit make a bypass for solid debris to enter directly on top of the compartment for collected debris and where a top lid (26) and a reversed rotation of the propeller (8) creates a pressure resulting in that the collected debris is emptied into e.g. a suitable floating filtering sack.

Figure 8A:
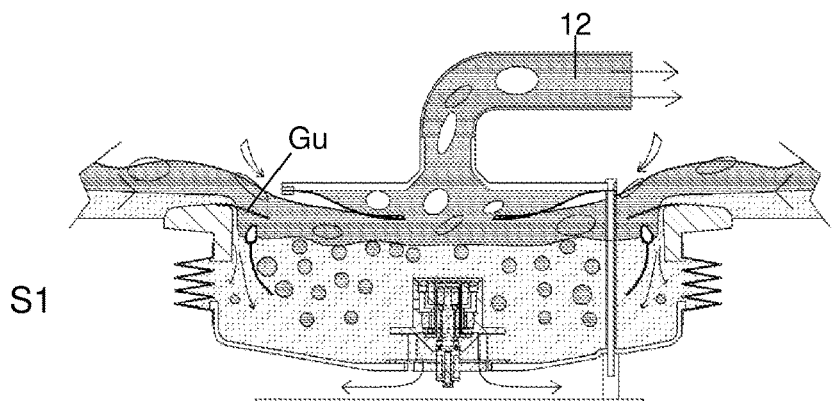
Figure 8B:
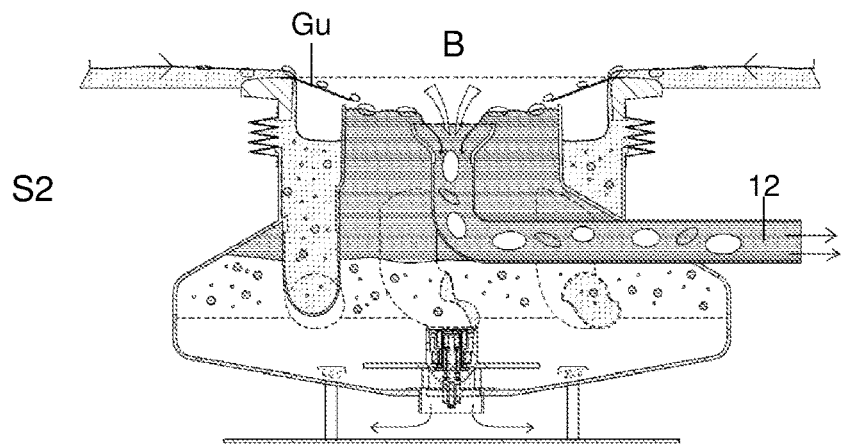
Figure 8C:
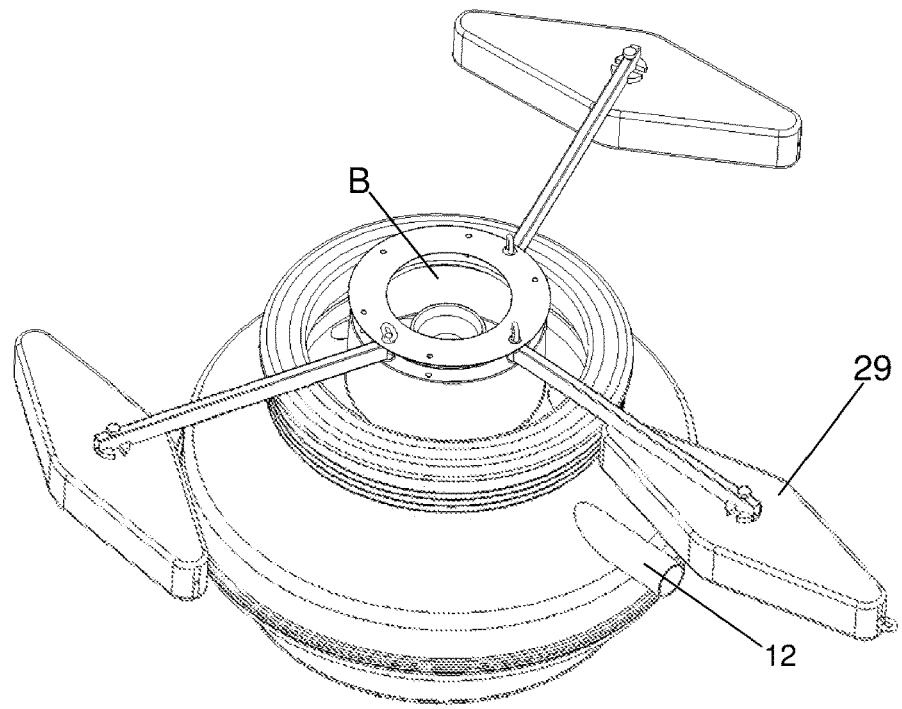

FIGS. 8a and 8b disclose cross-sectional views of the first (S1) and second (S2) embodiments of the skimming and separation device with or without a guiding unit (Gu) suitable as a battery powered separating vacuum nozzles for cleaning water surfaces. FIG. 8c is a perspective view of the skimming and separation device.

DETAILED DESCRIPTION OF PREFERRED EMBODIMENTS OF THE INVENTION

The skimming and separation device will now be described in detail with references to the appended figures. Throughout the figures the same, or similar, items have the same reference signs. Moreover, the items and the figures are not necessarily to scale, emphasis instead being placed upon illustrating the principles of the invention.

FIGS. 1-4 illustrate various embodiments of the skimming and separation device, provided with a bypass member (B) being open to atmospheric pressure or a bypass member (C) where a vacuum power source is powering a pilot operated regulator or an electro-pneumatic regulator to maintain a predetermined constant under pressure to increase the height of the collating volume of the skimming and separation device above the inlet level (outside the separator). This is to secure that no water is entering into the bypass member (C) that by e.g. adding air to the collected pollutants can secure continuous removal of collected debris and facilitate its transportation to a suitable vacuum and storage tank (not shown) without disturbing the ongoing separating functions of the device.

First with references to FIGS. 1a and 1b, a skimming and separation device of type S1 is shown, which is provided with a bypass member B which is open to atmospheric pressure. The skimming and separation device of type S1 comprises an outer casing 1 provided with constructions to which parts are directly or indirectly attached, including floaters (not shown). The outer casing 1 defines an open container 2.

A floater 3 is provided and being configured to create the skimming function of the device. The floater is attached at its lower side to an essentially vertically arranged bellow 4 allowing the floater to move from an upper position which is illustrated in FIG. 1a, in which position essentially no flow will enter into the container 2, to a lower position which is illustrated in FIG. 1b, in which position a flow of water 5 and debris 6 may flow in a downward direction into the container 2.

The water will follow the contours of the floater 3 and flow downwards to the water level 7. The water level 7 is determined by the speed of the propeller 8, the floating forces of the floater 3 and by the force gradients acting on the bellow 4 and floater 3.

A cylindrical baffle 9 is preferably arranged which can be floating and/or attached to the floater 3 or to the outer casing 1. The baffle 9 is structured to reduce turbulences in the collecting compartment 10 and facilitates thereby debris to return to the surface area 11 inside the cylindrical baffle 9. The debris 6 in this illustrated example consists of floating foam that is a large problem in many wastewater treatment plants. If the floating layer of foam is thick it will follow the flow of water into the container 2 and to a large extent "jump over" the cylindrical baffle 9 and accumulate on the surface area 11. The bypass member B with a suction nozzle b1 with or without a flexible member b2 is in this example attached to the outer casing 1 with the rod 1a and further to a suction tube 12 that further is attached to an under pressure (vacuum) source and container (not shown).

The bypass member is open to the atmospheric pressure 13 and will, in combination with the under pressure (vacuum) in the suction tube 12, create a suction force that will create a flow of air that continuously will take care of the collected debris that enters into the airflow. Thereby a mixture of air or e.g. hot steam will facilitate transportation of collected pollutions to a suitable vacuum tank (not shown) without interference with the separating functions of the device, i.e. the separating functions are bypassed.

In FIGS. 2a and 2b are shown a skimming and separation device of type S2 equipped with a bypass member (B) which is open to atmospheric pressure and provided with a suction nozzle b1. The skimming and separation device of type S2 comprises an outer casing 1 provided with constructions comprising parts being directly or indirectly attached to the casing. Those parts include floaters (not shown) and also define an open container 2. FIG. 2a shows the skimming and separation device in a resting position and FIG. 2b shows the device in an active position.

A floater 3 is provided and being configured to create the skimming function of the device. The floater is attached at its lower side to an essentially vertically arranged bellow 4 allowing the floater to move from an upper position shown in FIG. 2a with essentially no flow into the container 2 to a lower position shown in FIG. 2b generating a skimming wear as described in relation to FIG. 1. The flow of water 5 and debris 6 in a downward direction is first entering into a collecting toroid shaped open compartment 14 that is structured to concentrate thin floating layers into a thicker layer 35. The flow on to the surface of compartment 14 generates turbulence that forms drops of e.g. oil and/or foam that having an appropriate flow rate to flow into the transporting tubes 15 and will eventually enter into the separation and collecting container 2 that is open to atmospheric pressure.

As clearly seen in FIGS. 2a and 2b the suction tube 12 enters the device through the side wall and bends upwards and ends in the suction nozzle b1 that has a funnel structure that widens upwards at a level slightly below the level of the floater 3. The funnel structure shape and orientation of the suction nozzle enable creation of a mixture zone of fluids.

FIG. 2c discloses a cross-sectional view from above through the lower part of the separation device illustrated in FIGS. 2a and b where the transportation tubs 15 comprises an angled lower tube part, a deflection unit 16 configured to direct the liquid flow of the tubes in an essentially horizontal outward direction inside the container 2 such that the direction of the liquid flow is in an oblique direction in relation to the external vertical wall 17 of the container 1. All deflection units 16, e.g. five, are arranged at essentially the same angle v in relation to the wall, e.g. in a direction that is in the range of 20-60 degrees to the separator wall, thereby the liquid flow from all tubes will together generate a rotational movement of water and pollutants illustrated by the arrows 16a within the separation compartment 2.

The angular deflection units 16 create a rotational flow which in turn results in an essentially even distribution of a vertical speed of the flow towards the outflow tract of the propeller 8. A baffle 18 may be provided that can reduce turbulences generated by the propeller 8.

For fluid having densities close to the density of water the vertical speed towards the propeller 8 has to be low in order not to overcome the gravimetric forces that strive to bring the pollutants towards the top of the open collecting part of the compartment 2. The open container 2 is also equipped with a bypass member (B) open to atmospheric pressure consisting of a vacuum nozzle (b1) attached to a suction tube 12 that is attached to, and passes through the container 2 and further being connected to a vacuum container (not shown). When an increasing amount of pollutions are settled in the open collecting part of the container they will start to rise above the water level in the toroid shaped compartment 14 due to the fact that they have a lower density than water. The suction nozzle b1 in combination with the open bypass arrangement B will continuously remove the collected debris 6 by using a mix of air (or steam and/or hot water if e.g. thick crude oil is collected), from the separator without any disturbances of its separating function and also keep the collected pollutions in rapid motions to the storage tanks. The continuous removal of pollutants with no need of support from a reversing propeller force may considerably increase the separation capacity of the device.

If the density of the collected pollution is close to that of water the gravimetric forces generated by the collected pollutants will be too low to force the pollutants into the vacuum nozzle b1. In these cases the rotational speed of the propeller 8 may be temporarily reduced by a control unit (not shown) getting signals from e.g. capacitance sensors that e.g. are attached to the vacuum tube 12 (not shown) resulting in that the water level and thus also the collected debris will come closer to the inlet of the nozzle (b1) as indicated in FIG. 2a. This problem may also be solved as is disclosed in relation to FIGS. 3a and b, and in FIGS. 4a-4c.

For large amounts of pollutions with low densities as e.g. foam, this embodiment S2 as well as the embodiment S1 described in relation to FIG. 1a and 1b, are structured to receive and discharge pollutants that enter directly to the nozzle (b1) by a flow of pollutants over the barrier between the compartment 14 and 2.

The embodiments illustrated in FIGS. 3a and 3b are similar to the embodiments illustrated in FIGS. 2a-2c in that they both comprise a skimming and separation device of type S2 provided with a bypass member (B) with a suction nozzle b1 being open to atmospheric pressure. The skimming and separation device of type S2 comprises an outer casing 1 provided with constructions that directly or indirectly attach parts, including floaters (not shown), and that also defines an open container 2.

FIG. 3a illustrates a separation device of type S2 where the external vertical wall 17 and the transporting tubes 15 are prolonged in order to generate a larger collected pollutants volume with a larger depth in order to create larger gravimetric forces especially when the collected pollutants having densities being close to the density of water. The larger gravimetric forces will force the collected pollutants into the suction nozzle (b1) and will be carried away together with a mix of air (or steam and/or hot water if e.g. thick crude oil is collected) to a suitable vacuum tank (not shown).

FIG. 3b illustrates a separation device of type S2 where the internal vertical wall 17a of the container 2 and the transporting tubes 15 are prolonged especially in order to generate a larger depth of the collected pollutants volume to create larger gravimetric forces when the densities of collected pollutants having densities being close to the density of water. The larger gravimetric forces will force the collected pollutants into the suction nozzle (b1) and will be carried away together with a mix of air (or steam and/or hot water if e.g. thick crude oil is collected) to a suitable vacuum tank (not shown).

In FIGS. 4a-4c are disclosed examples of another embodiment according to the invention where a vacuum power source is powering a pilot P operated regulator or an electro-pneumatic regulator bypass member C. The bypass member C is illustrated in a larger scale in FIG. 4c.

The constant under pressure will increase the height of the collected debris 20 in the tube 19 resulting in increased gravimetric forces which means that if a water column should replace the collected debris it would be too heavy to reach the outlet level of the nozzle (b1) and thus secure that no water is entering into the collecting vacuum tank. The bypass member C is configured to continuously take care of the collected debris that enters into the airflow 21 such that a mixture of air or e.g. hot steam facilitate transportation of collected pollutions to a suitable vacuum tank (not shown) without interference with the separating functions of the device.

If there are low amounts of pollutants to be separated, sensors may be provided and placed inside the lower part of the collecting compartment (not shown). These sensors may sense parameters, e.g. pressure, conductivity that may be used as control parameters to turn on and off the suction forces.

With references to FIGS. 5-7 other embodiments of the present invention will be described. According to these embodiments a guiding unit Gu is provided. The guiding unit is structured to be arranged in the skimming and separating device disclosed herein and provides for a bypass function for in particular solid debris 24 such as e.g. bottle caps, pieces of plastic, pieces of bark and wood, leaves or other plant debris. The solid debris will then enter on top of the collected pollutants directly for further transportations by the vacuum powered bypass system B to a suitable vacuum tank. The debris may also, as illustrated in FIG. 7, be transported to a suitable storage unit by pressure.

FIG. 5c is a top view illustrating an example of a guiding unit (Gu). The guiding unit Gu is a preformed unit having an essentially circular shape with a diameter adapted to the diameter of the separator device where the unit is to be arranged in relation to the floater 3. The guiding unit Gu is in one embodiment provided with more or less stiff fingerlike protrusions 22 directed inwards. It is further shown in FIG. 5c by means of examples 22a and 22b how the fingers 22 may be made to have both guiding functions and bending possibilities. The fingerlike protrusion 22a may be molded in e.g. any suitable plastic polymer where a bendable hinge is made by a narrow polymer contact between the outer ring 23 and the fingerlike protrusion 22a. Preferably, the fingers of the guiding unit have equal lengths, and the lengths of the fingers are adapted to the size of the device, i.e. they have a length that ensures that solid debris is guided to the discharge zone of the bypass member.

The fingerlike protrusion 22b may be made in stainless steel with a bendable zone close to the outer ring 23.

In FIGS. 5a and 5b are shown cross sectional views of the previously disclosed skimming and separation devices S1 and S2, respectively, to demonstrate how, in these cases, a preformed guiding unit Gu will guide solid debris 24 directly on to the top 25 of the collected pollutants for further transportations by the vacuum powered bypass system B to a suitable vacuum tank.

Further embodiments are illustrated in FIGS. 6-7. These embodiments are particularly suitable to be used in larger systems powered by e.g. solar power energy, to clean surfaces on lakes, rivers etc. In these embodiments shown in FIGS. 6 and 7 a guiding unit Gu provided with bendable fingers 22a and 22b, respectively, is attached to the floater 3 in the skimming and separation device S1 and S2, respectively. The guiding unit Gu is structured to transfer debris 24 like e.g. bottle caps, pieces of plastic, pieces of bark and wood, leaves or other plant debris directly to the discharge zone Dz onto the top 25 of other collected pollutants for further transportations by pressure to a suitable storage unit. In these illustrated embodiments a lid 26 is attached to a floater arrangement (not shown) that further (not shown) is attached to the outer casing 1. The lid 26 is further equipped with a suitable sack unit 27 to work as a storage unit with further filtration possibilities during the emptying phase of the whole arrangement. The lid is has an essentially circular shape and is horizontally arranged. The lid is adapted to cooperate with the upper surface of the floater such that in the collecting phase an air gap 28 between the floater 3 and the lower surface of the lid 26 is present. During the emptying phase the upper surface of the floater and the lower surface of the lid are in direct contact with each other. This will be further discussed below.

FIGS. 6a and 7a illustrate cross sectional views of the skimming and separation device S1 and S2, respectively, during their collecting phase. During this phase there will be an air gap 28 between the flow of water and debris on top of the floater 3 and the lid 26. Besides the possibilities to bypass larger debris 24 to the discharge zone Dz the skimming and separation device S1 and S2, respectively, will be able to perform separations which has been described above. Specifically, the embodiment shown in FIGS. 7a and 7b (S2) is even capable to separate oil pollutants.

In FIGS. 6b and 7b are illustrated cross sectional views of the skimming and separation device S1 and S2, respectively, during their emptying phase. During this phase the propeller 8 will change its rotational direction, in comparison to the rotational direction during the collecting phase illustrated in FIGS. 6a and 7a, which is achieved by a control signal from its control box (not shown). This will generate a positive pressure inside the container 2 that results in that the floater 3 will move upwards until it is in direct contact to the lid 26. The whole surface area of the collected pollutants and larger debris will now be forced to leave the separator and in accordance with these embodiments enter into a suitable pollution collecting member (27), e.g. a collecting filtering sack 27. The created fluid height during the emptying phase will force the whole device floating on pontoons with adapted floating characteristics (not shown) to sink deeper which will decrease the need of elevating forces for discharging the pollutants into e.g. a filtering sack 27. This will decrease the energy consumption and work in favor for a solar cell powered surface cleaning system, i.e. it requires less power.

In one variation of the skimming and separation device of type S2 illustrated in FIG. 7b the sack 26 may be provided with oil absorbing filters for taking care of oil pollutants. FIGS. 8a-8c illustrates further embodiments of the skimming and separation device, being a battery powered and hand movable separator with pontoons 29. FIG. 8c is a schematic perspective view of one variation of the device.

The devices are equipped with a bypass member B which is open to the atmospheric pressure. Optionally the device may be provided with a guiding unit (Gu), where the bypass member is connected to a suction tube 12 that further is attached to e.g. a large wet vacuum cleaner or to a mobile vacuum truck. The first embodiment (S1) is in particular suitable for collecting floating foam in waste water purification plants or floating debris as e.g. bottle caps, pieces of plastic, pieces of bark and wood, leaves or other plant debris on water ponds.

These embodiments may also be constructed in larger dimensions, i.e. dimensions up to several meters in diameter, and may then be designed as a surface cleaning boat or platform e.g. driven and powered by tugboats with vacuum tanks.

In all the above embodiments the propeller 8 may be of a cutting type to avoid debris to wind up around the propeller. The above mentioned embodiments may also be used for building larger units and platforms for e.g. offshore use, lake and river cleaning where e.g. electric generators, steam generators, weed cutting equipment, screw pumps etc. may be applied to improve transportations of pollutants to a suitable storage unit.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:
1. A skimming and separation device comprising
an outer casing provided with constructions to directly or indirectly fasten all parts, defining an open container,
a floater configured to create the skimming function of the device,
a vertically arranged bellow extending between the outer casing and the floater, wherein the floater is attached at its lower side to the vertically arranged bellow allowing the floater to adapt flow into a substantially circum volume and allowing the floater to move from an upper position with essentially no flow into the container to a lower position allowing flow of water and debris follow the contours of the floater in a downward direction into the device,
- a power device with a propeller, wherein said power device is configured to be controlled by a control signal from a control box such that various kinds of flows and pressures may be generated to control the in-flow and outflow of the device, and wherein the power device is fastened to the outer casing,
- a bypass member being in fluid communication to an under pressure source via a suction tube, such that, during operation, an essentially continuously under pressure suction force is available at the bypass member, wherein said bypass member is structured to continuously subject debris and floating pollutions accumulated on an upper surface in the skimming and separation device to said suction force such that the debris and floating pollutions will enter the suction tube directly and to facilitate a continuous flow of debris and floating pollutions to a tank, and
- a guiding unit structured to be horizontally arranged along said floater, and wherein said guiding unit is provided with inwardly directed guiding fingers structured to guide solid debris directly to a discharge zone subjected to under pressure by said suction tube.

2. The skimming and separating device according to claim 1, wherein
said outer casing is at least partly open upwards to atmospheric pressure inside said floater.

3. The skimming and separation device according to claim 1, wherein said bypass member comprises a regulator arranged to maintain a predetermined constant under pressure to increase the height of the collating volume of the skimming and separation device above an inlet level.

4. The skimming and separation device according to claim 1, wherein said bypass member comprises a suction nozzle having a funnel structure.

5. The skimming and separation device according to claim 1, wherein said guiding fingers are essentially rigid.

6. The skimming and separation device according to claim 1, wherein said guiding fingers comprise a bendable zone close to an outer ring of the guiding unit, such that said guiding fingers is upwardly and/or downwardly bendable.

7. A skimming and separation device comprising
an outer casing provided with constructions to directly or indirectly fasten all parts, defining an open container,
a floater configured to create the skimming function of the device, the floater is attached at its lower side to an essentially vertically arranged bellow allowing the floater to adapt flow into a substantially circum volume and allowing the floater to move from an upper position with essentially no flow into the container to a lower position allowing flow of water and debris follow the contours of the floater in a downward direction into the device,
a power device with a propeller, wherein said power device is configured to be controlled by a control signal from a control box such that various kinds of flows and pressures may be generated to control the in-flow and outflow of the device, and
a guiding unit structured to be horizontally arranged along said floater, and wherein said guiding unit is provided with inwardly directed guiding fingers structured to guide solid debris directly to a discharge zone on an upper liquid surface in the skimming and separation device.

8. The skimming and separating device according to claim 7, wherein said guiding fingers are essentially rigid.

9. The skimming and separating device according to claim 7, wherein said guiding fingers comprise a bendable zone close to an outer ring of the guiding unit, such that said guiding fingers is upwardly and/or downwardly bendable.

10. The skimming and separating device according to claim 7, wherein a lid is provided and adapted to cooperate with an upper surface of the floater such that, during a collecting phase, an air gap between the floater and the lower surface of the lid is present, and that during an emptying phase the upper surface of the floater and the lower surface of the lid are in direct contact with each other, and that said lid is in flow communication to a pollution collecting member, preferably a collecting filtering sack.

* * * * *